March 22, 1949.  W. S. MURRAY  2,465,329
INDIUM TREATED COPPER CLAD BEARING AND LIKE
ARTICLES AND METHOD OF MAKING THE SAME
Filed May 20, 1944

INVENTOR.
WILLIAM S. MURRAY
BY
Blair Curtis & Hayward
ATTORNEYS

Patented Mar. 22, 1949

2,465,329

UNITED STATES PATENT OFFICE 2,465,329

INDIUM TREATED COPPER CLAD BEARING AND LIKE ARTICLES AND METHOD OF MAKING THE SAME

William S. Murray, Utica, N. Y., assignor to The Indium Corporation of America, Utica, N. Y., a corporation of New York Application May 20, 1944, Serial No. 536,633

3 Claims. (Cl. 29—196.3)

This invention relates to indium (including indium alloy) coatings on steel and to the method of applying such coatings and to specific indium coated steel products, particularly bearings.

It has been known for some time that the highest quality bearings are those having indium in the bearing surface. Thus in high power aviation engines the fullest development of power and reliability has been possible only by use of such bearings. Most commonly such bearings have been made with a steel body onto which is plated a layer of silver followed by a layer of lead and finally by a layer of indium which is diffused into the metal beneath it by a mild heat treatment at a temperature only a little above the melting point of indium. Although such bearings are in satisfactory production and use, nevertheless the application of the silver to the steel has given great difficulty and continues to be a principal cause of difficulty and expense in the manufacture of such articles.

In a copending application, Serial No. 432,639, filed February 27, 1942, now abandoned, I have shown that excellent bearings for many purposes can be made without the under layer of silver; but, even with direct application of the lead by powder metallurgy, electroplating, hot dipping, or spraying, as ordinarily applied, there may be difficulty in meeting fully the severe requirements, e. g. of the highest power aeronautical engines. In such engines a bearing failure may result in serious injury or loss of an entire ship and its personnel, and consequently acceptability in such bearings must be almost synonomous with perfection.

Accordingly, it is an object of this invention to improve the quality of bearings and other articles fabricated of steel surfaced with indium. Another object of the invention is to provide a practical and inexpensive method of producing high quality articles under commercial operating conditions.

To this end the invention contemplates the joining of a surface layer of a desired non-ferrous bearing metal, especially copper, to steel by mechanical working hot or cold, e. g. by methods already well known for production of so-called "clad" steel sheets. Onto such a "clad" steel there is applied a layer or layers of one or more surfacing metals, for example, a bearing metal such as lead, cadmium, Babbitt metal, tin, silver, and/or indium. Advantageously the thicker layer (or layers) of bearing metal is covered with a final thin surfacing of indium or it is applied together with indium, for example as a codeposit of the bearing metal and indium. Such layer or layers may be applied by electroplating (complex plating in the case of alloys), powder metallurgy, hot dipping, casting, spraying, etc.

With the copper or other non-ferrous cladding metal thus integrally applied to the steel, surfacing metals can be applied thereon by usual methods and will readily adhere and even merge with the copper into an integral article. For many articles it is desirable to apply indium directly on this copper clad steel. A small amount thus applied, e. g. up to about 7 mg. per square inch, can be alloyed into the copper surface by diffusion giving a reddish to warm white alloy, depending upon the proportions, having excellent resistance to abrasion, corrosion and fatigue. The copper indium alloy thus produced is also hard which is desirable for many applications, but for bearings it is ordinarily more advantageous to have a softer surface which may be supplied by a surface layer of indium not fully diffused into the copper so that the indium or an indium alloy softer and substantially lower melting than copper constitutes the initial actual bearing surface. Or a softer bearing metal such as lead, cadmium, or tin may be used over the copper or instead of it on the clad steel body. Thus the copper clad steel may first be plated with lead and then with indium or both may be applied simultaneously by coplating, diffusing with alloy or supplying as a mixed powder or foil which is compressed and eventually anchored to the copper by diffusion. If a softer metal such as cadmium, tin or lead is used as the cladding metal, an intermediate metal is not necessary and the indium may be applied directly to the clad steel and thoroughly diffused into the surface for production of a bearing.

The articles may be formed from the clad steel and such articles plated after formation is complete; or, as a further development of my invention, the clad steel may have such additional layers of metal applied while the steel is still unfabricated, and then subsequently be formed into bearings or other articles. The clad steel thus prepared has advantage in the forming process and the articles formed therefrom are superior to those made by present methods.

One example of the practical application of the invention is the formation of bearings from copper-clad sheet steel wherein the copper, although in very thin surface layer, is mechanically welded firmly to the steel, and the application to the surface of this clad sheet of an intermediate bearing metal which will alloy therewith by diffusion without melting of the copper. This intermediate metal preferably is one, such for example as lead, cadmium, tin, silver, or a bearing alloy such, for example, as Babbitt metal. Other layer or layers of bearing metal or metals may be applied, but advantageously the final surface layer is indium or an indium alloy.

Instead of copper, bronzes, brasses and other alloys in which copper is the major component, may be employed; it being noted that the term "copper-clad" as used herein is intended to designate articles wherein a surface layer of copper or such copper alloys of any desired thickness, e. g. 0.01"–0.001", are surface welded throughout to another metallic element, such as steel or other high strength alloy, advantageously by a mechanical working process such for example as the processes commonly used for the manufacture of copper-clad steels, etc.

In a preferred embodiment of my invention a copper clad sheet with 0.003" Cu, is stamped and formed as accurately as possible to the desired bearing, but with an excess clearance sufficient to accommodate after reaming, etc., the thickness of intermediate metal which is to be applied. It is then reamed and polished to a more accurate surface (the copper cladding, of course, being sufficiently thick to accommodate this final machining). White bearing metal is then plated onto the copper-clad article, the layer of white bearing metal being about .001" or as desired within a range from .00075" to .0015". The bearing surface may be again polished or burnished after application of the white metal. A smaller amount of indium is then plated onto the surface.

In general, a desirable range of weights for the indium is from 3% to 6% of the weight of the white bearing metal, although this, as will be appreciated, is dependent to some extent on the thickness of the latter and on the heat treatment used. Particularly good results are obtained by plating onto the copper a layer of lead to the extent of 186 mg. per square inch, and then plating indium onto the lead to the extent of 8.5 mg. per square inch.

A layer of cadmium weighing 140 mg. per square inch may be applied instead of the 186 mg. of lead, with very good results.

With accurate machining and burnishing of the copper, the intermediate metal may be omitted and excellent bearings for some purposes are thus made by direct application of indium to the copper clad steel.

After the indium has been applied to or with the other desired metals, the bearing member is heated up to about 165° C. and held at such temperature for several hours. This final indium plating and heat treatment may be in accord with the standard procedures used at present for indium plating bearings. The bearings thus plated may again be burnished or put into service without further preparation. Such burnishing, if used, may replace the heating, at least in part, since it tends to cause diffusion of the indium.

Whether the indium is diffused by heat or by mechanical working, it is desirable that the diffusion should not, until the bearing is put into service, proceed beyond the point at which there remains at the surface a layer of relatively low melting point metal of approximately the same order of thickness as expected inaccuracies of bearing surface which will have to be accommodated in use. When such a bearing is put into service any high spots which cause local overheating result first in a softening of this surface layer and consequent readjustment to relieve the local pressure and then a further diffusion of the indium which makes the bearing surface thereafter resistant to much higher temperatures.

The heat treatment may be omitted if desired, when the member is used as a bearing, as the stress and heat generated in the burnishing or even in use cause the indium to diffuse into the underlying metal.

In the accompanying drawings.

Figure 1:
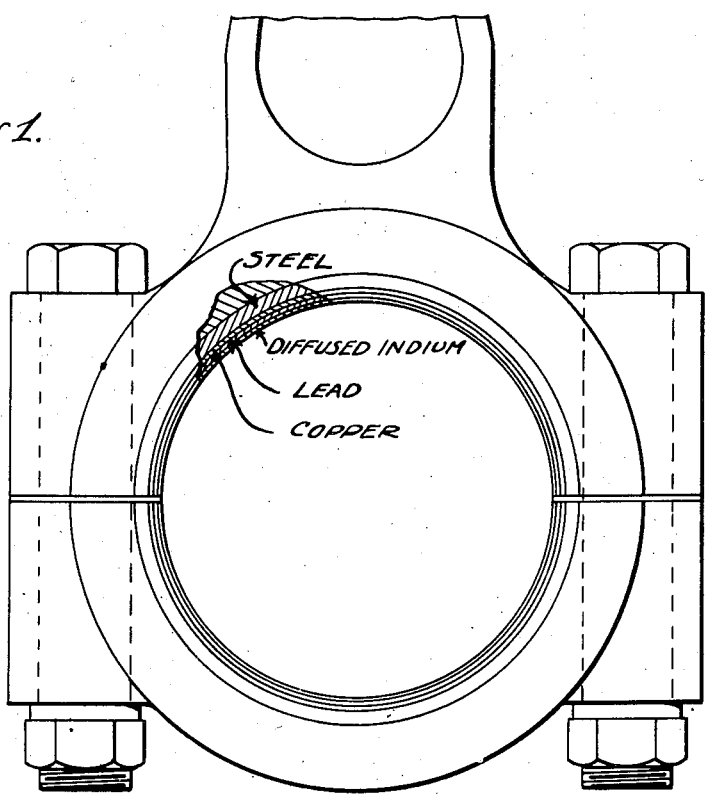
Figure 1 is a cross-sectional view of a split bearing sleeve embodying the invention.

Referring to Figure 1, there is shown a connecting rod bearing having a split sleeve bearing lighter made in accordance with the present invention. In the drawing I have indicated separate layers identified as steel, copper, lead and diffused indium. It will be understood, however, that in the article made in accordance with the present invention these layers are not sharply defined, but on the contrary the copper and the steel are welded together by the mechanical working and thus to some extent diffused across the interface. The indium is diffused into the lead by heat and/or mechanical working and the lead may also be partially diffused with the copper across the interface.

Figure 2:
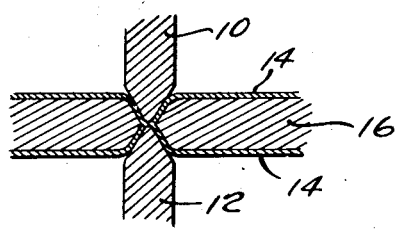
Figure 2 is a view in cross section of a cutting die cutting a clad sheet.

In Figure 2, I have shown, by a magnified cross-section, how with proper design of the tools 10 and 12 articles may be made from clad sheets in which the cladding metal is drawn across the edges and united before cutting through the cladding metal 14, so as to avoid exposing edges of the corrodible interior metal 16.

Figure 3:
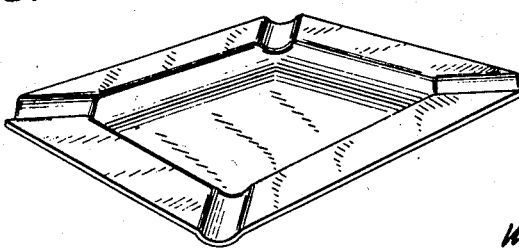
Figure 3 is a perspective view of an ash tray made by the present invention.

In Figure 3, I have shown by way of example, an ash tray made as a stamping by the method described above and with the edges formed as illustrated in Figure 2. This may be made from copper clad sheet coated and diffused with indium in the sheet prior to stamping, or it may be stamped to the form shown and subsequently plated with indium and diffused by heat treatment as described above. Such articles embodying this invention have a highly attractive and permanent, warm white surface, comparable in appearance to that of silver, and yet can be made less expensive and not subject to tarnishing.

In making articles which do not require precision dressing down of the surface after forming, there is advantage in plating the indium and any intermediate metals onto the clad steel stock before forming by stamping, drawing, spinning, cold forging or other mechanical working. Where such working is severe a heavier plate of indium is advantageous in order to provide for any loss of surface metal in the working operation. Where the cladding method involves drawing, extrusion or other process involving high surface friction, there is advantage even in plating with indium the billet or partly formed stock; whereby the indium serves to reduce the friction and facilitate these working operations.

The invention is applicable to a wide variety of articles, and provides an improved method of making numerous articles of utility and decoration from steel, wherein a surface coating is desired of a metal which does not adhere well directly on the steel. A number of such articles are mentioned in my copending applications, Ser. Nos. 422,720 and 537,724 filed, respectively, on December 12, 1941 and May 27, 1944, both now abandoned.

As an example of such other articles, table utensils similar to Sheffield ware can be made by stamping from copper clad sheet. After the article is completely formed and the surface burnished, it is given a plating of silver by ordinary methods of electro-plating and then a light plate of indium, e.g. 5-6 mg. per square inch. The article is then heated to 165° C. for about five hours and then cooled, re-burnished and polished.

In order to avoid leaving edges inadequately covered with the surfacing metals it is important to make all cuts by a cutting die or other device which draws the cladding metal in across the cut edge of the steel, as shown, for example, in Figure 2, rather than by shearing or sawing which would cut away the cladding metal and expose the steel at the edge.

Although certain specific examples of this invention and its application in practical use and also certain modifications and alternatives are given herein, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

I claim:
1. The process of making a bearing which comprises forming a copper-clad steel, shaping the same into a bearing, applying indium thereon and diffusing a part of the indium into the copper by heating to a temperature above the fusing point of indium and well below that of copper, leaving a softer surface portion in which the indium is not fully diffused into the copper and which therefore is softer and higher in indium content than an underlying portion.

2. An article comprising a copper-clad shaped steel member having thereon a layer of silver which contains indium at least at its surface.

3. A bearing which comprises copper formed substantially to a desired bearing surface and a surface layer thereon of indium of a thickness of the same order of magnitude as inaccuracies of said surface from said desired bearing surface.

WILLIAM S. MURRAY.

REFERENCES CITED

The following references are of record in the file of this patent:

UNITED STATES PATENTS

| Number | Name | Date |
|---|---|---|
| 399,245 | Converse | Mar. 12, 1889 |
| 1,658,173 | Perks | Feb. 7, 1928 |
| 1,899,569 | Howe | Feb. 28, 1933 |
| 1,904,241 | Kammerer | Apr. 18, 1933 |
| 1,960,740 | Gray | May 29, 1934 |
| 2,086,841 | Bagley | July 13, 1937 |
| 2,219,738 | Capson | Oct. 29, 1940 |
| 2,266,276 | Schluchter | Dec. 16, 1941 |
| 2,266,319 | Hobbs | Dec. 16, 1941 |
| 2,666,320 | Hobbs | Dec. 16, 1941 |
| 2,267,342 | Schwartz | Dec. 23, 1941 |
| 2,287,948 | Smart | June 30, 1942 |
| 2,288,656 | Smart | July 7, 1942 |
| 2,329,483 | Quenear | Sept. 14, 1943 |
| 2,354,218 | Murray | July 25, 1944 |
| 2,386,951 | Howe | Oct. 16, 1945 |

OTHER REFERENCES

Pp. 630-631, Product Engineering, Oct. 1943.